US012093700B2

(12) United States Patent
She et al.

(10) Patent No.: US 12,093,700 B2
(45) Date of Patent: Sep. 17, 2024

(54) REAL TIME PERIPHERAL CONFIGURATION VIA HARDWARE REQUEST

(71) Applicant: TEXAS INSTRUMENTS INCORPORATED, Dallas, TX (US)

(72) Inventors: Christy Leigh She, Allen, TX (US); Mangesh Subhash Dhantole, Bangalore (IN); Harish Maruthiyodan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/370,700

(22) Filed: Jul. 8, 2021

(65) Prior Publication Data

US 2022/0137983 A1     May 5, 2022

Related U.S. Application Data

(60) Provisional application No. 63/107,879, filed on Oct. 30, 2020.

(51) Int. Cl.
*G06F 9/4401*     (2018.01)
*G06F 13/10*     (2006.01)
*H04L 67/12*     (2022.01)

(52) U.S. Cl.
CPC .......... *G06F 9/4411* (2013.01); *G06F 13/102* (2013.01); *H04L 67/12* (2013.01)

(58) Field of Classification Search
CPC ............................ G06F 9/4411; H04L 67/12
See application file for complete search history.

(56) References Cited

U.S. PATENT DOCUMENTS

| | | | | |
|---|---|---|---|---|
| 10,725,954 | B2 * | 7/2020 | Snyder | ..................... H03B 5/32 |
| 2011/0246734 | A1 * | 10/2011 | Umbehocker | ........ G06F 3/0619 |
| | | | | 711/E12.001 |
| 2017/0063606 | A1 * | 3/2017 | Babu | ...................... G06N 20/00 |
| 2018/0116513 | A1 * | 5/2018 | Bhogu | ................... A61B 5/316 |
| 2018/0343563 | A1 * | 11/2018 | Adilipour | ............. H04L 67/306 |
| 2020/0284745 | A1 * | 9/2020 | Rauwolf | .............. G01N 27/223 |

* cited by examiner

*Primary Examiner* — Zachary K Huson
(74) *Attorney, Agent, or Firm* — Brian D. Graham; Frank D. Cimino; Xianghui Huang (57) ABSTRACT

A method for configuring a target peripheral via a hardware request is provided. The method includes receiving a hardware request from one of a plurality of initiator peripherals, receiving a configuration selection from the requesting initiator peripheral, and selecting a configuration from a plurality of hardware memory locations based at least in part on the configuration selection. The method also includes configuring one or more signal processing modules within the target peripheral based at least in part on the configuration, receiving a signal from an electronic device, and processing the signal from the electronic device with the one or more signal processing modules. The method further includes transmitting a processed signal from the signal processing modules to the requesting initiator peripheral.

20 Claims, 5 Drawing Sheets

REAL TIME PERIPHERAL CONFIGURATION VIA HARDWARE REQUEST

RELATED APPLICATIONS

This application hereby claims the benefit of and priority to U.S. Provisional Patent Application No. 63/107,879, titled "REAL TIME PERIPHERAL CONFIGURATION VIA HARDWARE REQUEST", filed on Oct. 30, 2020 and which is hereby incorporated by reference in its entirety.

TECHNICAL BACKGROUND

Electronic devices that produce data, such as sensors, controllers, meters, and the like, are now common throughout the modern world. They are found in a wide variety of environments including personal, commercial, educational, research, and industrial environments.

These electronic devices, such as sensors, are usually coupled with a processor for collection and processing of their data. In many implementations, multiple sensors are coupled with a processor for use in a variety of applications. However, different sensors need different signal chain configurations for the desired processing of their data. Currently, in a variety of implementations, each sensor is accessed by the processor in sequence, with a separate signal chain front end for each sensor or the processor executes software commands to configure an internal signal chain properly for each sensor.

As devices shrink in size, and become increasingly battery powered, power consumption of the processor becomes a limiting factor of battery life. Using a processor to access and execute software commands to configure one or more signal chains for multiple sensors uses a large amount of power, thus reducing battery life.

OVERVIEW

In an implementation, a method for configuring a target peripheral via a hardware request is provided. The method includes receiving a hardware request from one of a plurality of initiator peripherals, receiving a configuration selection from the requesting initiator peripheral, and selecting a configuration from a plurality of hardware memory locations within the target peripheral based at least in part on the configuration selection.

The method also includes configuring one or more signal processing modules based at least in part on the configuration, receiving a signal from an electronic device, and processing the signal from the electronic device with the one or more signal processing modules.

The method further includes transmitting a processed signal from the signal processing modules to the requesting initiator peripheral.

In another implementation, a microcontroller is provided. The microcontroller includes a plurality of initiator peripherals, and a target peripheral coupled with the plurality of initiator peripherals. The target peripheral is configured to receive a hardware request from a requesting initiator peripheral, receive a configuration selection from the requesting initiator peripheral, and select a configuration from a plurality of hardware memory locations within the target peripheral based at least in part on the configuration selection.

The microcontroller is also configured to configure one or more signal processing modules based at least in part on the configuration, receive a signal from an electronic device, and to process the signal from the electronic device with the one or more signal processing modules.

The microcontroller is further configured to transmit a processed signal from the signal processing modules to the requesting initiator peripheral.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

In one example embodiment of a low power sensing application, sensing occurs periodically and the system only responds if the sensing measurement is outside of a desired range. During normal operation the central processing unit (CPU) sleeps while a timer periodically triggers an analog-to-digital converter (ADC) to read the sensor.

When a reading outside the desired range is detected, the CPU wakes up, loads software instructions, processes the interrupt, configures the signal path for the reading, and goes back to sleep. Since CPUs draw large amounts of power, using the CPU even for rare occurrences greatly increases the power needs of the low power sensing application.

Battery powered sensing applications have moved toward multi-modality duty cycled sensing. However, different sensors need different signal chain configurations. In some embodiments, a single ADC with multiple inputs is used by pre-configuring a hardware sequencer to convert the data from each sensor with independent sample and hold times one after another in a sequence without usage of the CPU. However, this pre-configured signal chain does not offer any configurability on the fly.

Some current embodiments use a separate analog signal chain for each sensor. However, this is an expensive alternative. Other embodiments use software to reconfigure a single analog signal chain between different readings. However, this requires the CPU to run, which increases power consumption and latency. In still other embodiments, a single configuration (selected to work for all sensors but sub-optimal because settings such as filter cutoffs, gain, etc. are not individually selected for each sensor signal chain) is used across multiple sensors at a cost of performance. Also, this does not work in embodiments where one sensor requires a different signal chain than another. For example, in the case where two different sensors require different op amp configurations (for instance one for current to voltage conversion and another to filter).

In the example embodiments discussed below, smart target peripherals for use by multiple initiator peripherals with minimum CPU intervention (only during an initial configuration phase) are presented. These example embodiments of the present invention respond to hardware requests for activation, configuration, and operation of the initiator and target peripherals in order to receive and process data from a plurality of electronic devices, such as sensors.

Hardware requests are software/CPU-independent requests generated by a trigger or event (such as a general-purpose input/output (GPIO) input), or any hardware logic or circuit, such as a periodic timer event. The trigger or event may be generated by internal circuitry or come from external circuitry (such as the GPIO input). In contrast, software requests are software/CPU requests that are initiated by the CPU and require operation of the CPU to initiate the request.

Target peripheral configuration settings are divided into two sets. Base configuration settings include configuration settings that do not change with respect to the initiator peripheral. Device specific configuration settings include configuration settings that change within respect to the initiator peripheral.

In the target peripheral, a plurality of hardware memory locations are included for the initiator peripheral to select from for its desired device specific configuration. Within the initiator peripherals, hardware registers are included to indicate which one of the device specific configurations the initiator peripheral requires.

These requests are handled by a hardware request-ready/error interface between the one or more initiator peripherals and the one or more target peripherals, including a configuration select sideband signal indicating to the target peripheral which initiator peripheral is sending a request. In addition to these hardware requests, normal software requests from the CPU are handled in a similar fashion.

Figure 1:
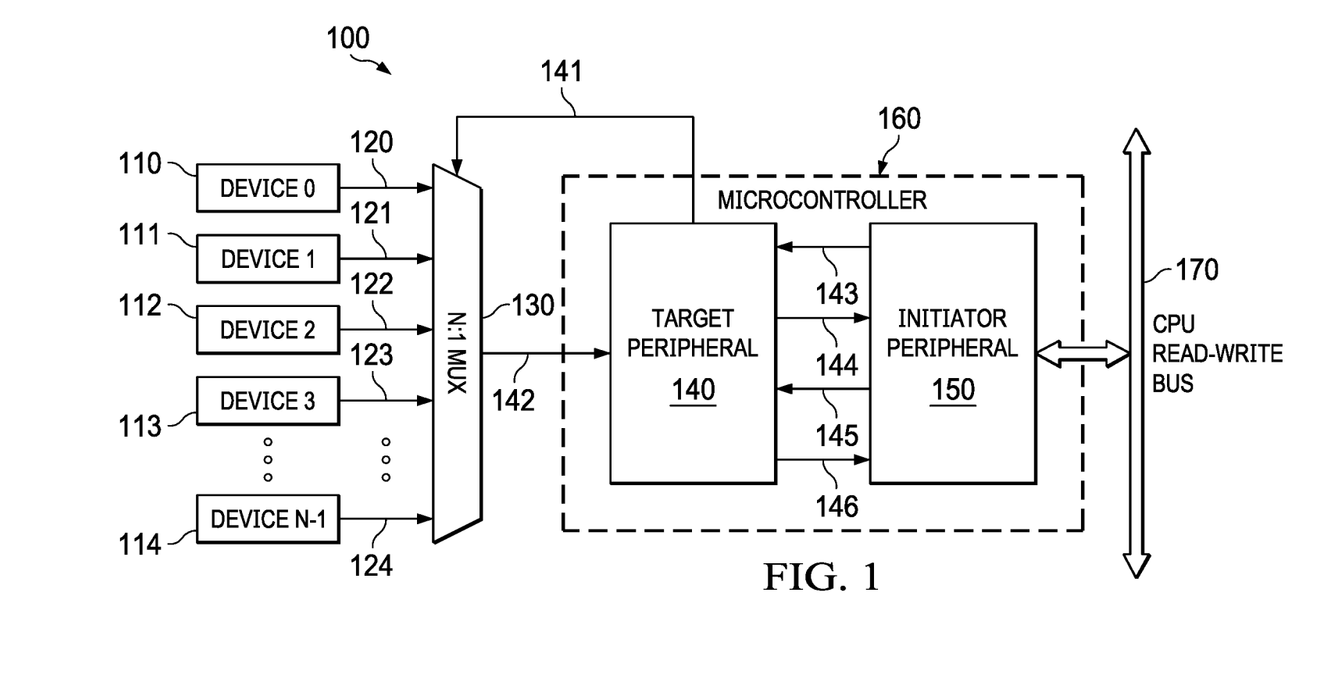
FIG. 1 illustrates an example embodiment of a system for configuring a target peripheral.

FIG. 1 illustrates an example embodiment of a system 100 for configuring a target peripheral. In this example embodiment of the present invention, a system 100 for configuring target peripheral 140 includes initiator peripheral 150 and target peripheral 140. In this example embodiment, initiator peripheral 150 and target peripheral 140 comprise microcontroller 160.

Initiator peripheral 150 communicates with a CPU (not shown) over CPU read-write bus 170. In some example embodiments CPU read write bus 170 is also coupled (not shown) with target peripheral 140 so that software requests from the CPU are handled normally by target peripheral 140.

Target peripheral 140 is coupled with initiator peripheral 150 by a hardware request-ready/error interface comprising signals 143-146. Enable request signal 143 is transmitted by initiator peripheral 150 to target peripheral 140 and is activated when initiator peripheral 150 requests enablement of target peripheral 140.

Ready signal 144 is transmitted by target peripheral 140 to initiator peripheral 150 and is activated when target peripheral 140 has received enable request signal 143 and configuration selection signal 145, and has configured its signal path as requested by configuration selection signal 145. Ready signal 144 does not indicate that the data produced by the signal path within target peripheral 140 is valid, but that the signal path is properly configured and is connected to the desired electronic device. In some embodiments, initiator peripheral 150 includes one or more registers and a timer allowing it to delay processing the data received from target peripheral 140 until that data is valid.

Figure 3:
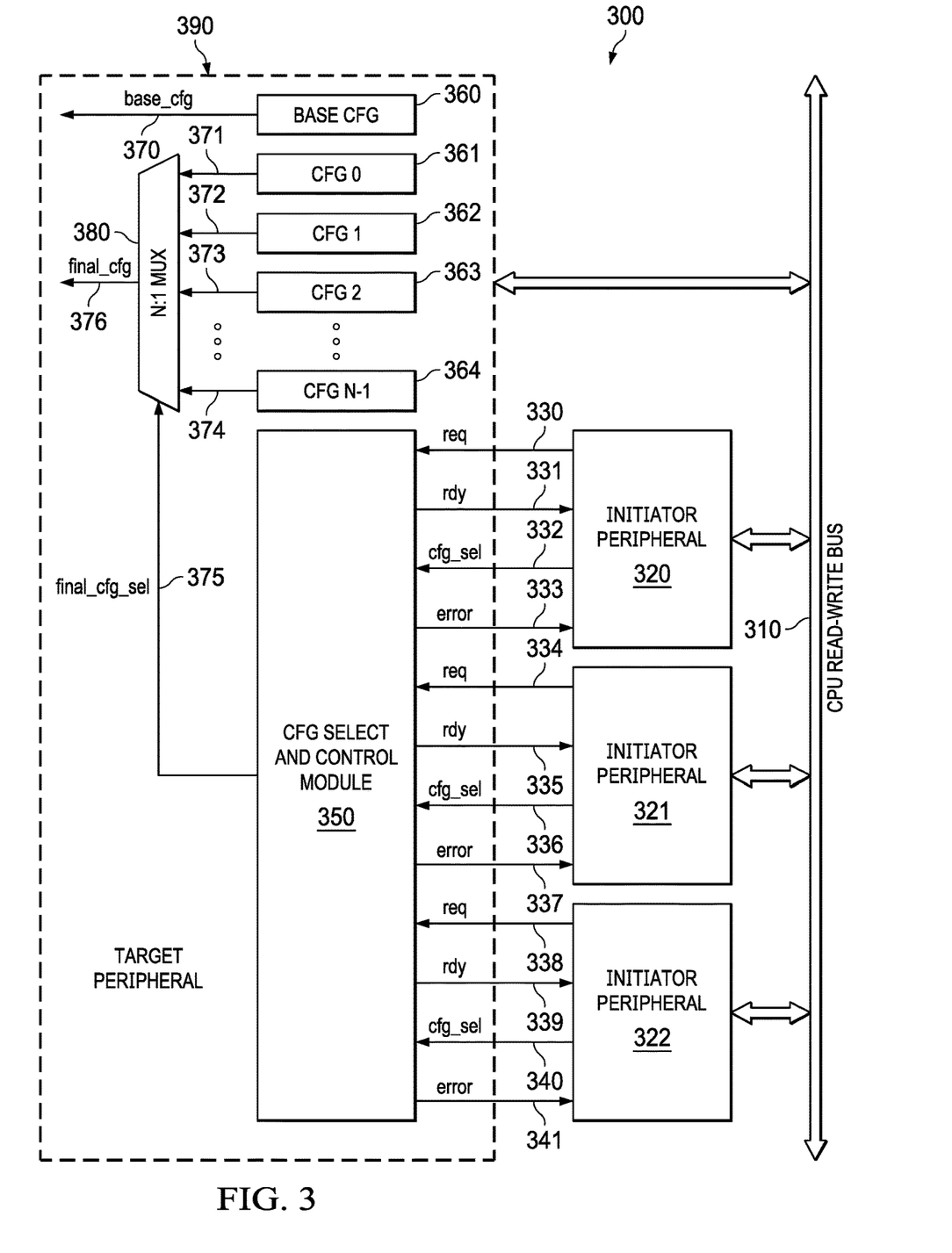
FIG. 3 illustrates an example embodiment of a system including a target peripheral configured by one of several initiator peripherals.
Figure 4:
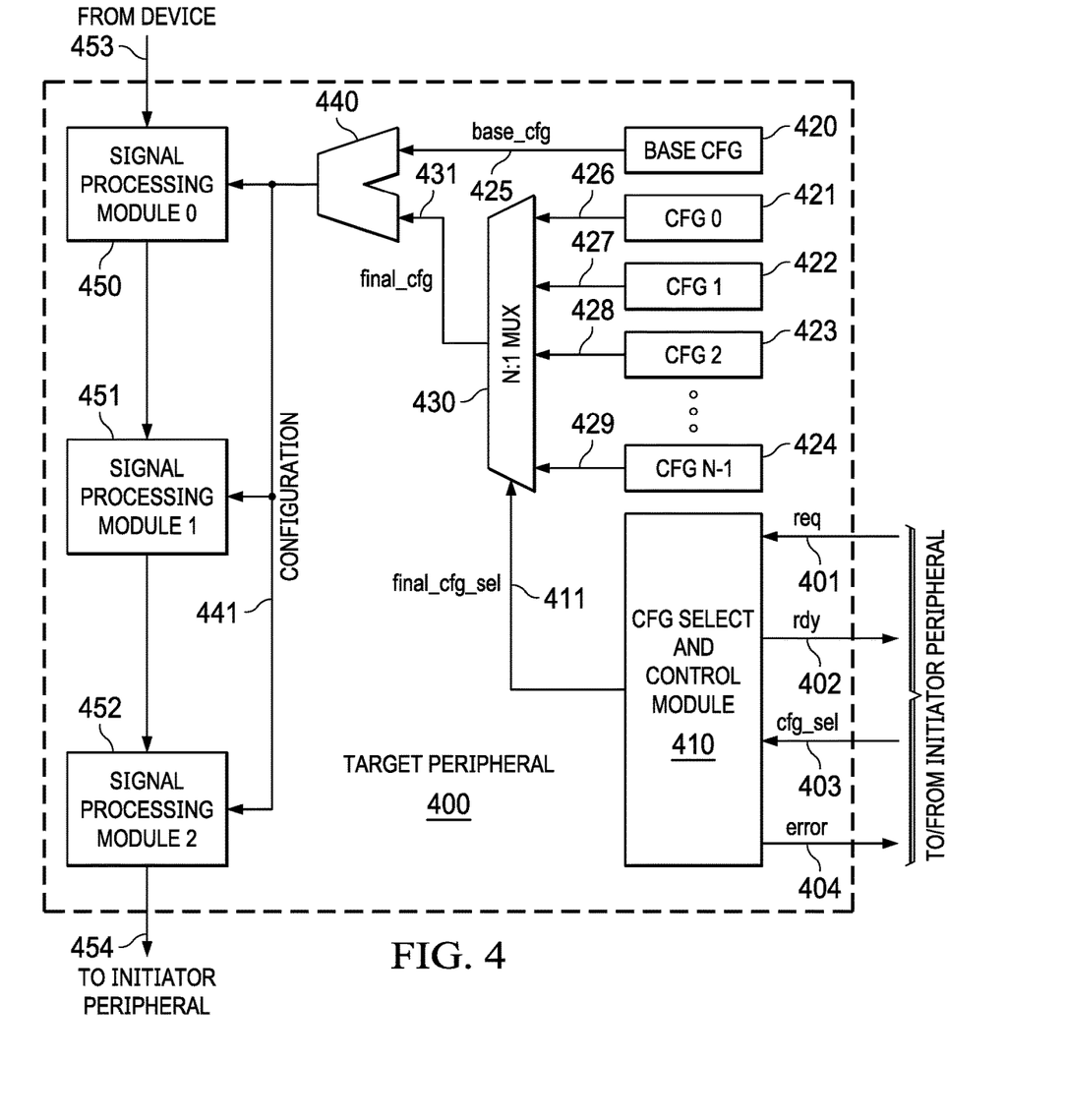
FIG. 4 illustrates an example embodiment of a target peripheral configured by an initiator peripheral.

Configuration selection signal 145 is transmitted by initiator peripheral 150 to target peripheral 140 and indicates which device specific configuration setting is to be used in configuring a signal path within target peripheral 140. This functionality is illustrated in FIGS. 3 and 4 and described in detail below.

Enable error signal 146 is transmitted by target peripheral 140 to initiator peripheral 150 and is activated when target peripheral 140 receives an enable request signal 143 from initiator peripheral 150 while it is busy processing other data. When target peripheral 140 completes its current operation and is ready to accept requests, enable error signal 146 is deactivated.

In this example embodiment, a plurality of data producing electronic devices 110-114 are available for use by microcontroller 160. The outputs 120-124 of electronic devices 110-114 respectively are connected to N:1 multiplexor (MUX) 130. Target peripheral 140 selects an electronic device for processing (as configured by initiator peripheral 150) and sends a select signal 141 to N:1 MUX 130. N:1 MUX 130 selects among the outputs 120-124 of electronic devices 110-114 respectively, and transmits the selected output 142 to target peripheral 140 for processing.

In operation, the CPU powers up and configures a plurality of base configuration settings in all target peripherals. The CPU also configures the plurality of hardware memory locations within the initiator peripheral that the initiator peripheral selects from for its desired device specific configuration. After these configuration operations, the CPU transitions into a low power or sleep state.

At any time, if any initiator peripheral requires the use of a target peripheral, it asserts its enable request signal 143 to one of the shared target peripherals 140. The selected target peripheral 140 executes a configuration control finite state machine (illustrated in FIG. 5 and described below) to ensure that only one initiator peripheral is served at a time, the correct configuration selection signal 145 will be received from initiator peripheral 150, and only one initiator peripheral 150 will receive a ready signal 144 when target peripheral 140 is ready.

Once initiator peripheral 150 receives ready signal 144, initiator peripheral 150 begins use of shared target peripheral 140. If initiator peripheral 150 receives an enable error signal 146 (for example, due to incorrect time division multiplexing of target peripheral 140), initiator peripheral 150 waits to send an enable request signal 143 later or generates an interrupt or event to the CPU. While performing processing operations, target peripheral 140 indicates that it is busy to all other initiator peripherals.

Figure 2:
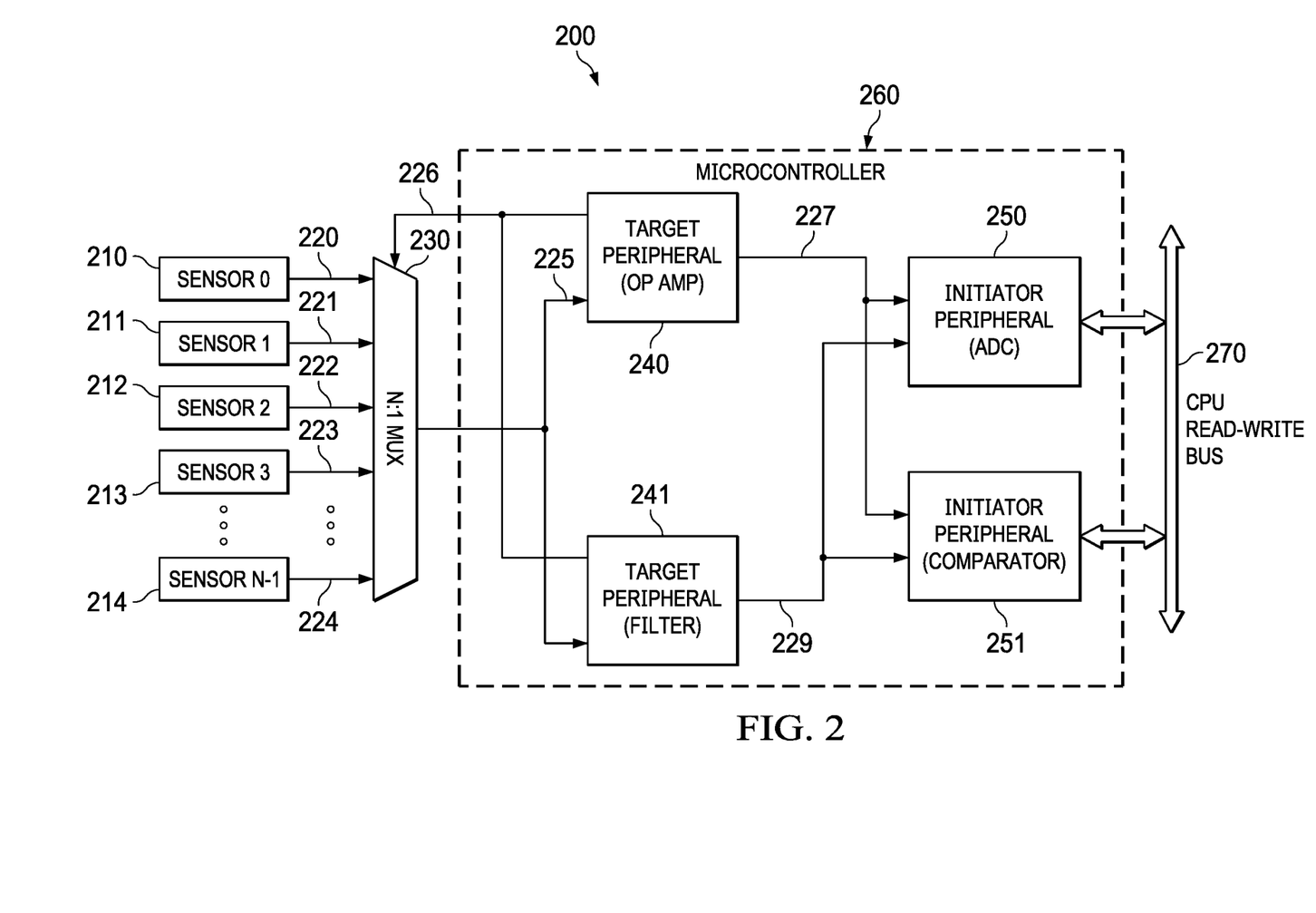
FIG. 2 illustrates an example embodiment of a system for configuring a target peripheral.

FIG. 2 illustrates an example embodiment of a system 200 for configuring a target peripheral. This example system 200 is similar to the simple system illustrated in FIG. 1, but illustrates multiple initiator peripherals 250 and 251 and target peripherals 240 and 241 within microcontroller 260.

In this example embodiment, a plurality of sensors 210-214 transmit their outputs 220-224 respectively to N:1 MUX 230 for transfer to the target peripherals 240 and 241 within microcontroller 260 over link 225. Target peripherals 240 and 241 use select signal 226 to control N:1 MUX 230. While this example embodiment illustrates N:1 MUX 230 as an element external to microcontroller 260, other embodiments include N:1 MUX 230 within microcontroller 260.

Initiator peripherals 250 and 251 communicate with a CPU (not shown) over CPU read-write bus 270. In some example embodiments CPU read write bus 270 is also coupled (not shown) with target peripherals 240 and 241 so that software requests from the CPU are handled normally by target peripherals 240 and 241.

In this example embodiment initiator peripheral 250 is an analog-to-digital converter (ADC) and initiator peripheral 251 is a comparator. Target peripheral 240 is an op amp and target peripheral 241 is a filter. As illustrated here, multiple initiator peripherals and target peripherals may be configured in any of a wide variety of configurations all within the scope of the present invention.

The output of target peripheral 240 is transferred to initiator peripherals 250 and 251 over link 227. The output of target peripheral 241 is transferred to initiator peripherals 250 and 251 over link 229.

Similar to the system of FIG. 1, target peripherals 240 and 241 are coupled with initiator peripherals 250 and 251 by a hardware request-ready/error interface which is not illustrated here for clarity.

FIG. 3 illustrates an example embodiment of a system 300 including a target peripheral 390 configured by one of several initiator peripherals 320-322. In this example embodiment, three initiator peripherals 320-322 are illustrated along with a portion of target peripheral 390.

Initiator peripherals 320-322 communicate with a CPU (not shown) over CPU read-write bus 310. In this example embodiment, CPU read write bus 270 is also coupled with target peripheral 390 so that software requests from the CPU are handled normally by target peripheral 390.

In this example embodiment, target peripheral 390 includes configuration select and control module 350, base configuration register 360, device specific configuration registers 361-364, and N:1 MUX 380. Base configuration register 360 contains configuration settings that do not change with respect to the initiator peripheral. Device specific configuration registers 361-364 contain configuration settings that change within respect to the initiator peripheral.

Base configuration register 360 provides its contents as base_cfg signal 370. Device specific configuration registers 361-364 provide their contents to N:1 MUX 380 over links 371-374 respectively. N:1 MUX 380 is controlled by final_cfg_sel signal 375 from configuration select and control module 350, and selects an output from one of the device specific configuration registers 361-364 and provides it as final_cfg signal 376.

Each of the initiator peripherals 320-322 are coupled with target peripheral 390 via a hardware request-ready/error interface similar to that illustrated in FIG. 1. Initiator peripheral 320 is coupled to target peripheral 390 via a hardware request-ready/error interface comprising enable request (req) signal 330, ready (rdy) signal 331, configuration select (cfg_sel) signal 332, and enable error (error) signal 333. Initiator peripheral 321 is coupled to target peripheral 390 via a hardware request-ready/error interface comprising enable request (req) signal 334, ready (rdy) signal 335, configuration select (cfg_sel) signal 336, and enable error (error) signal 337. Initiator peripheral 322 is coupled to target peripheral 390 via a hardware request-ready/error interface comprising enable request (req) signal 338, ready (rdy) signal 339, configuration select (cfg_sel) signal 340, and enable error (error) signal 341.

Configuration select and control module 350 is configured to interface with the three initiator peripherals 320-322 and to process their requests. When configuration select and control module 350 receives enable request and configuration select signals from an initiator peripheral, it produces configuration select (final_cfg_sel) signal 375 based at least in part on the configuration select signal received from the initiator peripheral.

The configuration select (final_cfg_sel) signal 375 controls N:1 MUX 280 to select between the outputs 371-374 of the drive specific configuration registers 361-364 to produce final configuration (final_cfg) signal 376 which is used to configure signal processing modules (see FIG. 4).

FIG. 4 illustrates an example embodiment of a portion of a target peripheral 400 configured by an initiator peripheral (not shown). FIG. 4 illustrates additional modules of target peripheral 390 from FIG. 3.

In this example embodiment, target peripheral 400 is coupled with an initiator peripheral (not shown) via a hardware request-ready/error interface similar to that illustrated in FIG. 1. This hardware request-ready/error interface comprises enable request (req) signal 401, ready (rdy) signal 402, configuration select (cfg_sel) signal 403, and enable error (error) signal 404.

In this example embodiment, target peripheral 400 includes configuration select and control module 410, base configuration register 420, device specific configuration registers 421-424, N:1 MUX 430, signal combination module 440, and three signal processing modules 450, 451, and 452. Base configuration register 420 contains configuration settings that do not change with respect to the initiator peripheral. Device specific configuration registers 421-424 contain configuration settings that change within respect to the initiator peripheral.

Base configuration register 420 provides its contents as base_cfg signal 425. Device specific configuration registers 421-424 provide their contents to N:1 MUX 430 over links 426-429 respectively. N:1 MUX 430 is controlled by final_cfg_sel signal 411 from configuration select and control module 410, and selects an output from one of the device specific configuration registers 421-424 and provides it as final_cfg signal 431.

Configuration select and control module 410 is configured to interface with the initiator peripherals and to process their requests. When configuration select and control module 410 receives enable request and configuration select signals from an initiator peripheral, it produces configuration select (final_cfg_sel) signal 411 based at least in part on the configuration select signal received from the initiator peripheral.

The base configuration (base_cfg) signal 425 is combined with the final configuration (final_cfg) signal 431 in signal combination module 440 to produce the configuration signal 441. This configuration signal 441 is used to configure signal processing modules 450, 451, and 452 as desired by the initiator peripheral. In this example embodiment, signal processing modules 450, 451, and 452 make up an analog signal chain. Here, the three signal processing modules 450, 451, and 452 are connected in series. Other embodiments of the present invention use any number of signal processing modules. For example, many target peripherals contain a single signal processing module.

In this example, signal processing module 0 450 receives data 453 from a device or sensor (such as those illustrated in FIGS. 1 and 2), processes the data 453 and passes its results to signal processing module 1 451 for further processing. Signal processing module 1 451 processes the data from signal processing module 0 450 and passes its results to signal processing module 2 452 for further processing. Signal processing module 2 452 processes the data from signal processing module 1 451 and passes its results 454 to the initiator peripheral (not shown).

In various embodiments of the present invention, signal processing modules 0-2 450-452 comprise any of a wide variety of modules that are configured to process, condition, filter, modify, or otherwise alter electronic signals. Various embodiments of signal processing modules 0-2 450-452 contain analog and/or digital signal processing elements, in any configuration, within the scope of the present invention. Note that while this example embodiment illustrates the signal processing modules 450, 451, and 452 as contained within target peripheral 400, other embodiments may locate the signal processing modules outside of target peripheral 400. For example, in some example embodiments, the signal processing modules 450, 451, and 452 reside within the initiator modules, or operate as software modules within the CPU. Other embodiments use other quantities, types, configurations, and locations of signal processing modules, all within the scope of the present invention.

Figure 5:
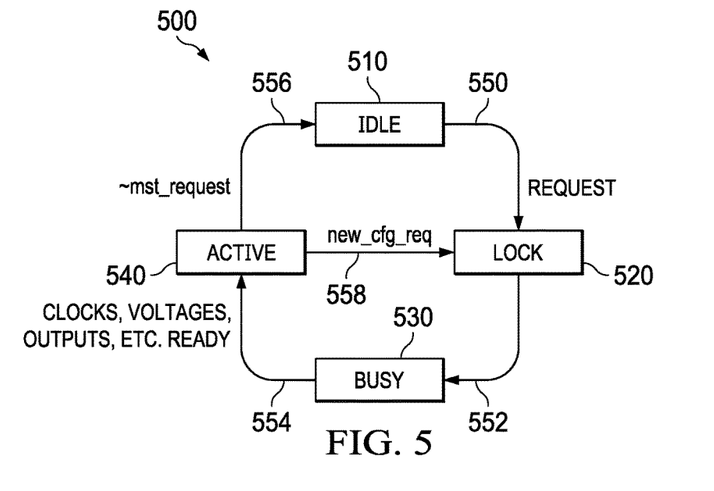
FIG. 5 illustrates an example embodiment of a finite state machine within a target peripheral.

FIG. 5 illustrates an example embodiment of a finite state machine 500 within a target peripheral. In this example embodiment, state machine 500 includes four states: idle 510, lock 520, busy 530, and active 540.

In the idle state 510, the target peripheral is not performing any operations and is ready to serve any initiator peripheral. When the target peripheral receives an enable request from an initiator peripheral it transitions 550 into the lock state 520. Note that enable requests from new initiator peripherals are only serviced while the state machine is in the idle state 510. In all other states, the target peripheral asserts an error signal in response to any enable requests.

In the lock state 520, the target peripheral has locked a configuration for the requesting initiator peripheral. If multiple requests are received simultaneously from multiple initiator peripherals, a fixed priority is followed in arbitration.

Once the target peripheral is locked, the state machine transitions 553 to the busy state 530, where the target peripheral configures its analog signal chain in preparation for the processing of data from an electronic device. Once the target peripheral has properly configured its analog signal chain, the state machine transitions 554 to the active state 540, where the signal chain is properly configured and operating. During the active state 540, the target peripheral asserts a ready signal to the initiator peripheral indicating that it is in operation.

Once the target peripheral completes its operation, the state machine either transitions 556 back to the idle state 510 if the initiator peripheral has de-asserted its enable request, or transitions 558 back to the lock state 520 if a new configuration request is received from the initiator peripheral while it continues to assert its enable request.

Figure 6:
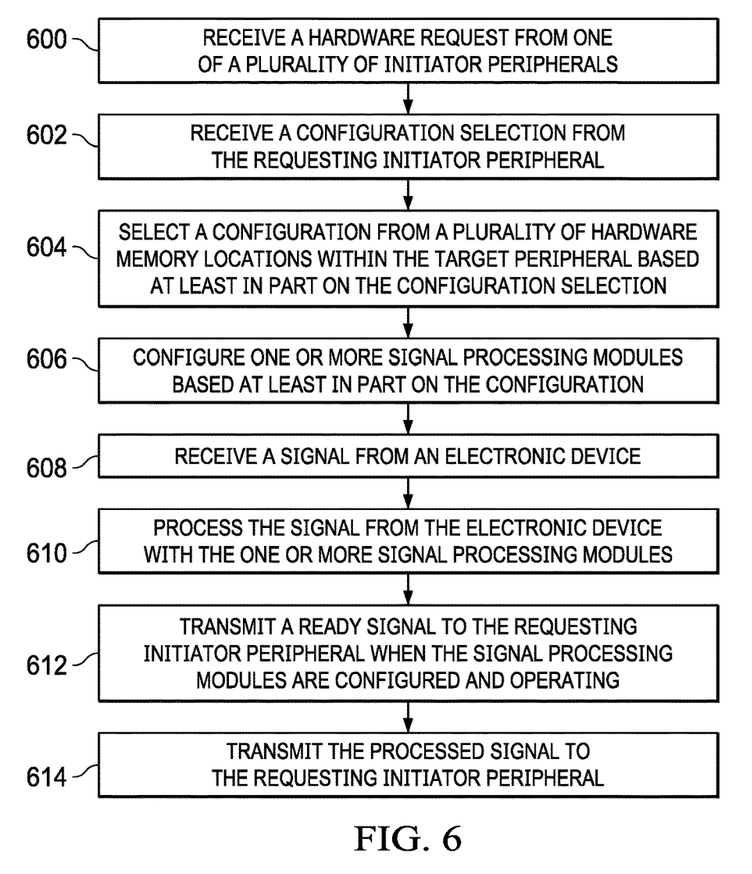
FIG. 6 illustrates an example method for configuring a target peripheral.

FIG. 6 illustrates an example method for configuring a target peripheral. FIG. 6 is a flowchart illustrating an example embodiment of a method for configuring a target peripheral 390. In this example method a target peripheral 390 is configured by an initiator peripheral 320, that in turn communicates with a CPU over read-write bus 310.

In this example embodiment, target peripheral 390 receives a hardware request from one 320 of a plurality of initiator peripherals 320-322, (operation 600). Target peripheral 390 also receives a configuration selection 332 from the requesting initiator peripheral 320, (operation 602)

Target peripheral 390 selects a configuration 441 from a plurality of hardware memory locations 361-364 within target peripheral 390, based at least in part on the configuration selection 332, (operation 604). Target peripheral 390 configures one or more signal processing modules 450-452, based at least in part on the configuration 441, (operation 606).

Target peripheral 390 receives a signal 453 from an electronic device, (operation 608). Target peripheral 390 processes the signal 453 from the electronic device within the one or more signal processing modules 450-452, (operation 610).

Optionally, target peripheral 390 transmits a ready signal 331 to the requesting initiator peripheral 320, (operation 612). Target peripheral 390 then transmits the processed signal 454 to the requesting initiator peripheral 320, (operation 614).

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A method for configuring a target peripheral via a hardware request comprising:
   receiving the hardware request from a requesting initiator peripheral of a plurality of initiator peripherals;
   receiving a configuration selection from the requesting initiator peripheral;
   selecting a configuration from a plurality of hardware memory locations within the target peripheral based at least in part on the configuration selection;
   configuring one or more signal processing modules based at least in part on the configuration;
   receiving a signal from an electronic device;
   processing the signal from the electronic device with the one or more signal processing modules; and
   transmitting a processed signal from the signal processing modules to the requesting initiator peripheral.

2. The method of claim 1, wherein the configuration comprises a base configuration and a device specific configuration corresponding to the requesting initiator peripheral.

3. The method of claim 1, wherein the target peripheral is configured to transmit a ready signal to the requesting initiator peripheral only during an active state.

4. The method of claim 3, wherein the target peripheral is configured to transmit an error signal to the requesting initiator peripheral in response to the hardware request when the target peripheral is in a state other than an idle state.

5. The method of claim 1, wherein the electronic device is a sensor.

6. The method of claim 1, wherein the electronic device is selected by the target peripheral from a plurality of electronic devices.

7. The method of claim 6, wherein the target peripheral is configured to sequence inputs from the plurality of electronic devices.

8. The method of claim 1, wherein the target peripheral and plurality of initiator peripherals are components of a microcontroller.

9. The method of claim 1, further comprising:
   transmitting a ready signal to the requesting initiator peripheral when the signal processing modules are configured and operating.

10. The method of claim 1, wherein the requesting initiator peripheral is configured to delay latching the processed signal until the processed signal is stable and valid.

11. A microcontroller comprising:
   a plurality of initiator peripherals; and
   a target peripheral coupled with the plurality of initiator peripherals, wherein the target peripheral is configured to:

receive a hardware request from a requesting initiator peripheral;

receive a configuration selection from the requesting initiator peripheral;

select a configuration from a plurality of hardware memory locations within the target peripheral based at least in part on the configuration selection;

configure one or more signal processing modules based at least in part on the configuration;

receive a signal from an electronic device;

process the signal from the electronic device with the one or more signal processing modules; and transmit a processed signal from the signal processing modules to the requesting initiator peripheral.

12. The microcontroller of claim 11, wherein the configuration comprises a base configuration and a device specific configuration corresponding to the requesting initiator peripheral.

13. The microcontroller of claim 11, wherein the target peripheral is configured to transmit a ready signal to the requesting initiator peripheral only during an active state.

14. The microcontroller of claim 13, wherein the target peripheral is configured to transmit an error signal to the requesting initiator peripheral in response to the hardware request when the target peripheral is in a state other than an idle state.

15. The microcontroller of claim 11, wherein the electronic device is a sensor.

16. The microcontroller of claim 11, wherein the electronic device is selected by the target peripheral from a plurality of electronic devices.

17. The microcontroller of claim 16, wherein the target peripheral is configured to sequence inputs from the plurality of electronic devices.

18. The microcontroller of claim 11, wherein the target peripheral is one of a plurality of target peripherals within the microcontroller.

19. The microcontroller of claim 11, wherein the requesting initiator peripheral is configured to delay latching the processed signal until the processed signal is stable and valid.

20. The microcontroller of claim 11, wherein the target peripheral is further configured to transmit a ready signal to the requesting initiator peripheral when the signal processing modules are configured and operating.

\* \* \* \* \*